(12) United States Patent
Katayama et al.

(10) Patent No.: US 12,222,990 B2
(45) Date of Patent: Feb. 11, 2025

(54) FAQ CONSOLIDATION ASSISTANCE DEVICE, FAQ CONSOLIDATION ASSISTANCE METHOD, AND PROGRAM

(71) Applicant: NIPPON TELEGRAPH AND TELEPHONE CORPORATION, Tokyo (JP)

(72) Inventors: Taichi Katayama, Tokyo (JP); Yuichiro Sekiguchi, Tokyo (JP); Satoshi Mieda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/968,101

(22) PCT Filed: Feb. 6, 2019

(86) PCT No.: PCT/JP2019/004161
§ 371 (c)(1),
(2) Date: Aug. 6, 2020

(87) PCT Pub. No.: WO2019/156103
PCT Pub. Date: Aug. 15, 2019

(65) Prior Publication Data
US 2021/0026890 A1 Jan. 28, 2021

(30) Foreign Application Priority Data
Feb. 9, 2018 (JP) .................................. 2018-022425

(51) Int. Cl.
*G06F 7/00* (2006.01)
*G06F 16/903* (2019.01)
(Continued)

(52) U.S. Cl.
CPC ...... *G06F 16/906* (2019.01); *G06F 16/90332* (2019.01); *G06F 16/90335* (2019.01); *G06F 16/958* (2019.01)

(58) Field of Classification Search
CPC ............. G06F 16/958; G06F 16/90335; G06F 16/90332; G06F 16/906; G06F 16/3331
(Continued)

(56) References Cited

U.S. PATENT DOCUMENTS 6,377,944 B1 * 4/2002 Busey ...................... H04L 29/06
7,505,921 B1 * 3/2009 Lukas ................. G06Q 30/0633
705/37

(Continued)

FOREIGN PATENT DOCUMENTS

| JP | 2003-006207 A | 1/2003 |
| JP | 2007-149121 A | 6/2007 |
| JP | 2012-003704 A | 1/2012 |
| JP | 2017-072885 | 4/2017 |

OTHER PUBLICATIONS

International Search Report for PCT Application No. PCT/JP2019/004161, mailed Mar. 12, 2019, 1 page.
(Continued)

*Primary Examiner* — Md I Uddin

(57) ABSTRACT

A FAQ maintenance support device 1 includes a question determining unit 12 to extract determined question items determined as question items of a customer, from contents of an inquiry from the customer and a response to the customer; a query log extracting unit 14 to extract search queries, which corresponds to the question items of the customer stored in a FAQ search system and have been determined such that all FAQ as search results for the search query are useless for the customer; and a maintenance question candidate extracting unit 15 to perform clustering with elements of question items of FAQ registered in the FAQ search (Continued)

system, the determined question items, and the search queries, and based on the clustering result, extract a candidate question item of FAQ to be maintained, and thereby, maintenance such as addition and deletion of FAQ can be performed easily.

15 Claims, 11 Drawing Sheets

(51) Int. Cl.
*G06F 16/9032* (2019.01)
*G06F 16/906* (2019.01)
*G06F 16/958* (2019.01)

(58) Field of Classification Search
USPC ....... 707/616, 705, 706, 710, 711, 721, 723, 707/740, 741, 748, 767, 765, 769, 737, 707/999.003, 999.004, 999.005, 999.006, 707/E17.075, E17.078, E17.109; 717/202, 234, 700, 705, 709, 237, 239, 717/744, 256
See application file for complete search history.

(56) References Cited

U.S. PATENT DOCUMENTS

| | | | |
|---|---|---|---|
| 2003/0144994 A1* | 7/2003 | Wen | G06F 16/9535 |
| 2010/0228711 A1* | 9/2010 | Li | G06F 16/248 |
| | | | 707/706 |
| 2012/0040314 A1* | 2/2012 | Rubino, Jr. | G06Q 30/02 |
| | | | 434/81 |
| 2013/0024457 A1* | 1/2013 | Chua | G06F 16/30 |
| | | | 707/E17.046 |
| 2014/0149411 A1* | 5/2014 | Anand | G06F 16/35 |
| | | | 707/737 |
| 2016/0292204 A1* | 10/2016 | Klemm | G06F 16/3329 |
| 2017/0063776 A1* | 3/2017 | Nigul | G06N 5/022 |
| 2018/0052664 A1* | 2/2018 | Zhang | G06N 5/04 |

OTHER PUBLICATIONS

Suman Ravuri and Andreas Stolcke, "Recurrent Neural Network and LSTM Models for Lexical Utterance Classification", In Proc. INTERSPEECH 2015, pp. 135-139.
Kim, Yoon "Convolutional Neural Networks for Sentence Classification", In Proc. EMNLP 2014, pp. 1746-1751.

* cited by examiner

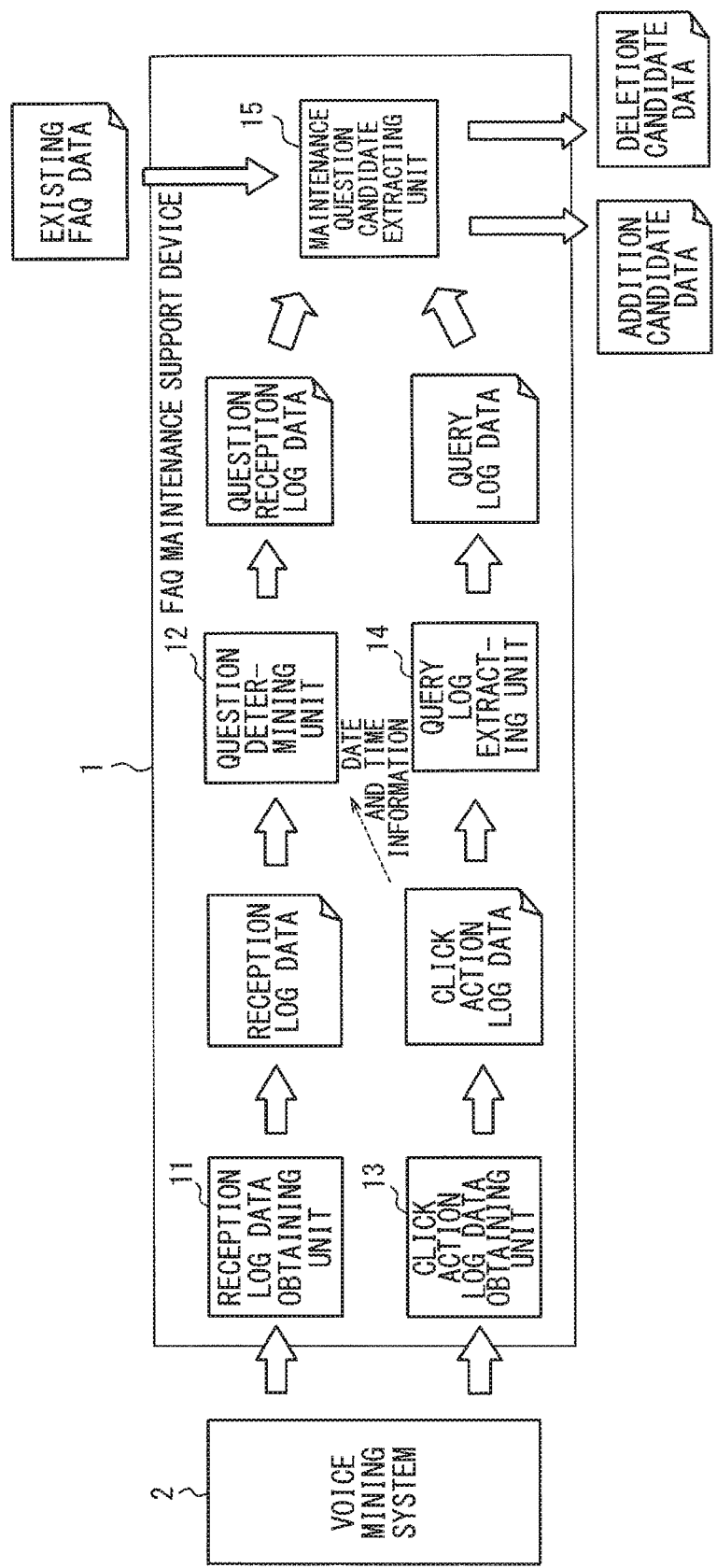

FIG.2A

| Channel | Voice recognition result | Date and time information |
|---|---|---|
| O | Thank you for calling. This is Call Center XX of OO. How can I help you? | |
| C | I want to cancel the Internet. | |
| O | May I have your name, address, and contract number, please? | |
| C | This is Taro Yamada, Tokyo XXX, and the contract number is 123-4567. | |
| O | Mr. Taro Yamada, you have an optical phone contract together with the Internet, are you sure you want to cancel the phone? | |
| C | What if I don't need the Internet but want to use the phone? | |
| O | If you cancel the Internet, the optical telephone will not be available. Therefore, you may open a separate account of a fixed-line telephone, or maintain the Internet contract and cancel only the contract with the provider. | |
| C | Then, I choose the latter. | |
| O | I understand. I proceed to the cancellation. | |
| C | Thank you. | |

FIG.2B

| Channel | Voice recognition result | Question determination | Date and time information |
|---|---|---|---|
| O | Thank you for calling. This is Call Center XX of OO. How can I help you? | × | |
| C | I want to cancel the Internet. | O | |
| O | May I have your name, address, and contract number, please? | × | |
| C | This is Taro Yamada, Tokyo XXX, and the contract number is 123-4567. | × | |
| O | Mr. Taro Yamada, you have an optical phone contract together with the Internet, are you sure you want to cancel the phone? | × | |
| C | What if I don't need the Internet but want to use the phone? | O | |
| O | If you cancel the Internet, the optical telephone will not be available. Therefore, you may open a separate account of a fixed-line telephone, or maintain the Internet contract and cancel only the contract with the provider. | × | |
| C | Then, I choose the latter. | × | |
| O | I understand. I proceed to the cancellation. | × | |
| C | Thank you. | × | |

FIG.3A

| Channel | Voice recognition result | Date and time information |
|---|---|---|
| C | I want to cancel the Internet. | |
| C | This is Taro Yamada, Tokyo XXX, and the contract number is 123-4567. | |
| C | What if I don't need the Internet but want to use the phone? | |
| C | Then, I choose the latter. | |
| C | Thank you. | |

FIG.3B

| Channel | Voice recognition result | Question determination | Date and time information |
|---|---|---|---|
| C | I want to cancel the Internet. | ○ | |
| C | This is Taro Yamada, Tokyo XXX, and the contract number is 123-4567. | × | |
| C | What if I don't need the Internet but want to use the phone? | ○ | |
| C | Then, I choose the latter. | × | |
| C | Thank you. | × | |

FIG.4

| FAQID | Question | Answer |
|---|---|---|
| 001 | cannot connect to the Internet | If you cannot connect to the Internet, please check XX. |
| 002 | Internet is slow | If the Internet is slow, please check OO. |
| 003 | How to cancel the Internet | For the cancellation, see △△..... |
| 004 | How to quit the Internet | How to quit the Internet is ...... |

FIG.5

| Search query | FAQID | Click result | Date and time information |
|---|---|---|---|
| delete history | 001 | Useless | 2017-06-22;12:05:44 |
| Internet slow | 002 | Helpful | 2017-06-23;15:52:42 |
| Internet cannot connect | 001 | Helpful | 2017-06-24;10:37:38 |
| Internet getting started | 003 | Useless | 2017-06-26;15:04:13 |
| Internet contract | 003 | Useless | 2017-06-27;17:45:19 |
| Internet slow | 001 | Useless | 2017-06-23;15:40:38 |
| Internet getting started | 004 | Useless | 2017-06-26;15:05:31 |
| Internet contract | 005 | Useless | 2017-06-27;17:48:01 |

FIG.7

| Search query | FAQID | Click result | Date and time information |
|---|---|---|---|
| telephone-only contract | 001 | Useless | 2017-06-22;12:05:44 |
| telephone-only contract | 002 | Useless | 2017-06-22;12:06:42 |
| telephone-only contract | 003 | Useless | 2017-06-22;12:07:38 |

FIG.9

| CLUSTER | NUMBER OF DATA ITEMS | AREA | DENSITY | RATIO OF NUMBER OF ELEMENTS | DENSITY × RATIO OF NUMBER OF ELEMENTS |
|---|---|---|---|---|---|
| A | 2 | 4 | 0.5 | 2/9 | 1/9 |
| C | 1 | 3 | 0.33 | 1/9 | 1/27 |
| F | 1 | 1 | 1 | 1/9 | 1/9 |

FAQ CONSOLIDATION ASSISTANCE DEVICE, FAQ CONSOLIDATION ASSISTANCE METHOD, AND PROGRAM

CROSS-REFERENCE TO RELATED APPLICATIONS

This application is a U.S. 371 Application of International Patent Application No. PCT/JP2019/004161, filed on 6 Feb. 2019, which application claims priority to and the benefit of JP Application No. 2018-022425, filed on 9 Feb. 2018, the disclosures of which are hereby incorporated herein by reference in their entireties.

TECHNICAL FIELD

The present invention relates to a FAQ maintenance support device, a FAQ maintenance support method, and a program that support maintenance of FAQ registered in a FAQ search system.

BACKGROUND ART

In recent years, a department that deals with customers, such as a department in charge of sales by phone or of reception of trouble, has an FAQ search system in which expected question items and answers to the question items (so-called FAQ (frequently asked questions)) are registered in a database in advance, so that the FAQ can be browsed and searched on the Web. Further, when answering an inquiry from a customer, an operation form becomes popular in which, according to the contents of the inquiry from the customer, the operator performs a search on the FAQ search system, and then, makes a response based on the answer of a found FAQ item.

The contents of FAQ as the basis of responses to inquiries change depending on changes in services to be provided, external situations, and inquiries from customers. To help operators make responses to customers appropriately and efficiently, it is necessary to maintain the contents of the FAQ continuously, such that for questions that are frequently inquired, answers are prepared and added as FAQ to the search system, and maintenance work such as addition and deletion of FAQ is very important.

For example, when adding new FAQ items, it is very important to determine what new pairs of questions and answers (wherein each pair includes one question and one answer) should be added, based on various information such as voice logs of customers, hearing results based on operational logs of operators, and the like. In order to make such determination, it is necessary to manually analyze a large amount of information that is being added at any time in everyday work; therefore, a huge cost is required.

In the case of adopting a FAQ search system as described above, the contents of an inquiry from a customer can be obtained as a search query; therefore, this search query can serve as a clue to add a new FAQ item. However, search queries also increase proportionally to the number of inquiries from customers; therefore, it is difficult to manually analyze all of the search queries.

Thereupon, an information search device has been proposed that is capable of searching for documents related to a search query with high precision, by calculating a degree of similarity between a keyword included in the search query and a keyword included in sentences to be searched stored in a database (see Patent Document 1). By using the technique described in Patent Document 1, it is possible to search for FAQ items that do not have a degree of similarity higher than or equal to a certain threshold, and to regard the FAQ items as candidates to be newly added to the FAQ search system.

RELATED ART DOCUMENTS

Patent Documents

[Patent Document 1] Japanese Laid-Open Patent Applications No. 2017-72885A

SUMMARY OF INVENTION

Problem to be Solved by the Invention

However, the information search device described in Patent Document 1 has a problem that it is difficult to set the threshold because, in the first place, the threshold fluctuates finely depending on the number of registered FAQ and the like.

In view of such circumstances, the present invention has been made with an object to provide a FAQ maintenance support device, a FAQ maintenance support method, and a program that enable easy performing of maintenance such as addition and deletion of FAQ.

Means for Solving the Problem

In order to solve the above problems, a FAQ maintenance support device according to the present invention is a device that supports maintenance of FAQ for a FAQ search system that presents FAQ related to an input search query, and includes a question determining unit configured to extract determined question items that have been determined as question items of a customer, from contents of an inquiry from the customer and a response to the customer; a query log extracting unit configured to extract search queries, the search queries corresponding to the question items of the customer stored in a FAQ search system, and for which all FAQ as search results have been determined as useless for the customer; and a maintenance question candidate extracting unit configured to perform clustering with elements of question items of FAQ registered in the FAQ search system, the determined question items, and the search queries, and based on the clustering result, extract a candidate question item of FAQ to be maintained.

Also, in order to solve the above problems, a FAQ maintenance support method according to the present invention is a method that supports maintenance of FAQ for a FAQ search system that presents FAQ related to an input search query by using a FAQ maintenance support device, and includes a step of extracting determined question items that have been determined as question items of a customer, from contents of an inquiry from the customer and a response to the customer; a step of extracting search queries, the search queries corresponding to the question item of the customer stored in a FAQ search system, and for which all FAQ as search results have been determined as useless for the customer; and a step of performing clustering with elements of question items of FAQ registered in the FAQ search system, the determined question items, and the search queries, and based on the clustering result, to extract a candidate question item of FAQ to be maintained.

Also, in order to solve the above problems, a FAQ maintenance support program according to the present invention causes a computer to function as the FAQ maintenance support device.

Advantage of the Invention

According to the present invention, question items of FAQ as candidates to be added are automatically presented; therefore, it is possible to eliminate time and effort to listen to a large amount of voice data to consider FAQ to be additionally registered in a FAQ search system. Especially, from the contents of reception with customers and questions of FAQ registered in the FAQ search system, it is possible to present FAQ that are highly likely not registered yet, as candidates to be added.

Further, by clustering FAQ registered in the FAQ search system, it is also possible to search for FAQ that have been registered in duplicate by mistake.

BRIEF DESCRIPTION OF DRAWINGS

FIG. 1 is a diagram illustrating an example of a hardware configuration of an FAQ maintenance support device according to an embodiment of the present invention;

FIGS. 2A-2B include diagrams illustrating an example of reception log data obtained from an operator and a customer, which is input into a FAQ maintenance support device according to an embodiment of the present invention;

FIGS. 3A-3B include diagrams illustrating an example of reception log data obtained from a customer, which is input into a FAQ maintenance support device according to an embodiment of the present invention;

FIG. 4 is a diagram illustrating examples of FAQ registered in a FAQ search system;

FIG. 5 is a diagram illustrating an example of click action log data;

FIG. 7 is a diagram illustrating an example of click action log data corresponding to reception log data obtained in FIG. 2B;

FIG. 9 is a diagram illustrating an example of the number of data items, area, density, ratio of the number of elements, and ratio of the density and the number of elements of clusters generated by a FAQ maintenance support device according to an embodiment of the present invention;

EMBODIMENTS OF THE INVENTION

Figure 6:
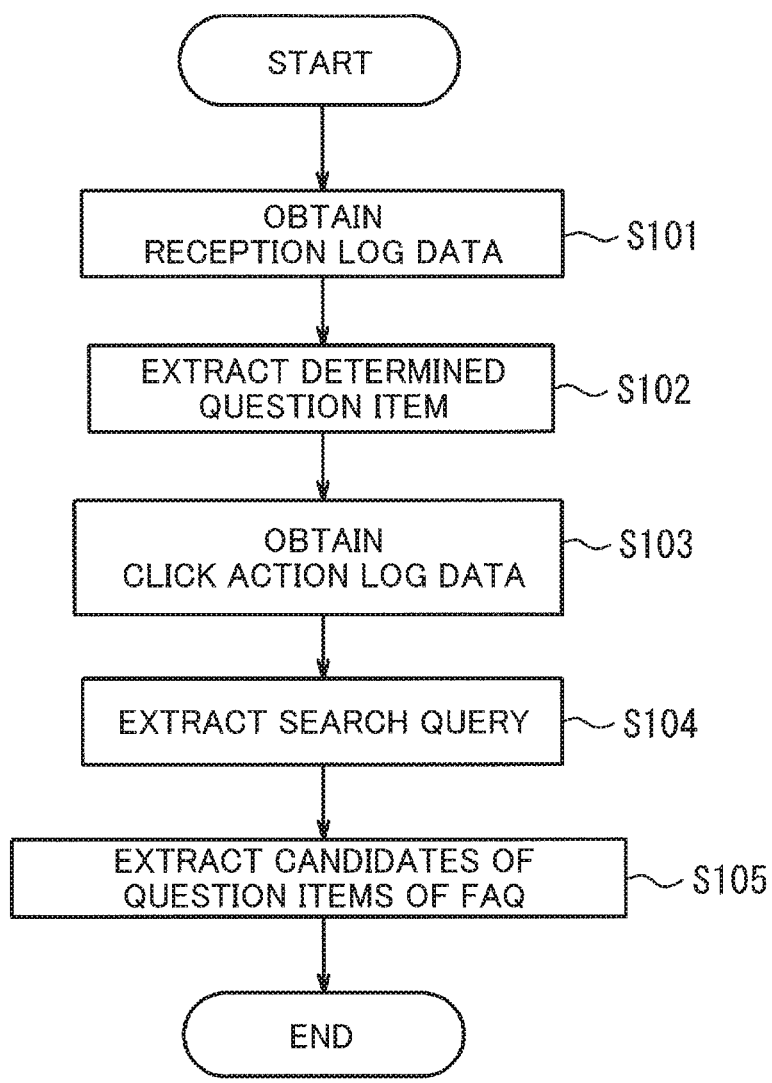
FIG. 6 is a flow chart illustrating a processing example executed by a FAQ maintenance support method according to an embodiment of the present invention.

In the following, an embodiment of the present invention will be described in detail with reference to the drawings.

In the following, a FAQ maintenance support device according to an embodiment of the present invention will be described. The FAQ maintenance support device is a device to support maintenance of FAQ for a FAQ search system that presents FAQ related to an input search query. FIG. 1 illustrates an example of a configuration of a FAQ maintenance support device according to an embodiment of the present invention. The FAQ maintenance support device 1 illustrated in FIG. 1 includes a reception log data obtaining unit 11, a question determining unit 12, a click action log data obtaining unit 13, a query log extracting unit 14, and a maintenance question candidate extracting unit 15.

Note that a computer can be suitably used for functioning as the FAQ maintenance support device 1. Such a computer may be implemented by storing a program that describes the processing contents for implementing functions of the FAQ maintenance support device 1 in a memory of the computer, and reading and executing the program by a CPU of the computer.

Also, this program may be recorded on a computer-readable medium. By using the computer-readable medium, the program can be installed on a computer. Here, a computer-readable medium on which the program is recorded may be a non-transitory recording medium. The non-transitory recording medium is not limited in particular, and for example, may be a recording medium such as a CD-ROM or DVD-ROM.

A voice mining system 2 generates reception log data, which is data obtained by applying voice recognition to the contents of talk between an operator and a customer and converting the recognized result into a document (text), and outputs the data to the reception log data obtaining unit 11. In the case where the contents are derived, not from an operator, but from automatic response (response made by an automatic response system) using a speech dialogue agent (speech dialogue system) or the like that can understand and utter natural language, the contents of utterance may be converted into a document by voice recognition, or the original text data of the contents of reception may be used. Also, in case of an inquiry via a chat on the Internet, from a system corresponding to the voice mining system 2, the input contents of customers and operators can be obtained as text (including automatic response by a chatbot system that can understand and respond to natural language); therefore, it is not always necessary to convert voice data into text.

Also, the voice mining system 2 generates click action log data that represents the contents of click actions performed by an operator with respect to FAQ obtained by the FAQ search system, and outputs the click action log to the data obtainment unit 13. In the FAQ search system, when a user such as an operator inputs a question item on the web, one or more answer candidates for the question are obtained. The click action refers to a click operation performed by a user on an obtained answer candidate, for example, on the web, a button that prompts a click if the answer candidate was helpful, and a button that prompts a click if the answer was useless are displayed, and in response to a click operation on one of the buttons performed by the user, information as to whether or not the answer candidate was useful is recorded as the click action log data.

The reception log data obtaining unit 11 obtains reception log data from the voice mining system 2, and outputs the data to the question determining unit 12. As described above, in the case where the reception log data is already available as text data, the text data may be used.

FIGS. 2A-2B illustrate an example of reception log data. The reception log data illustrated in FIG. 2A includes fields of channel, voice recognition result, and date and time information. The channel is set with an identifier for distinguishing whether the speaker is an operator or a customer, where O means the operator and C means the customer. In the present embodiment, although question determination is performed for each channel, namely, for each speaker, the determination may be more finely performed to distinguish each sentence. The date and time information refers to information representing the date and time when a voice was obtained, which is information representing, for example, "2017-06-22; 11:55:32". Note that in FIGS. 2A-2B, specific values of the date and time information are omitted.

The question determining unit 12 extracts, from reception log data input from the reception log data obtaining unit 11, determined question items that have been determined as question items of the customer, gathers the items as question reception log data, and outputs the data to the maintenance question candidate extracting unit 15. In other words, the question reception log data refers to data items that have been determined as question items among the reception log data items. Specifically, the question determining unit 12 obtains a voice recognition result from the reception log data by using a model learned by a classifier, to make a determination based on the information. In learning and determination, any known determiner can be used. For further details, see, for example, Suman Ravuri, Andreas Stolcke, "Recurrent Neural Network and LSTM Models for Lexical Utterance Classification", In Proc. INTERSPEECH 2015, pp. 135-139, 2015; and Yoon Kim, "Convolutional Neural Networks for Sentence Classification", In Proc. EMNLP 2014, pp. 1746-1751, 2014.

Once the reception log data illustrated in FIG. 2A has been input, the question determining unit 12 determines whether each channel is classified as a question sentence or not, to obtain determination results as illustrated in FIG. 2B. In the case where a session of reception is not partitioned into channels, the determination may be made on the session as a whole. Further, from the reception log data, the question determining unit 12 extracts two sentences of "I want to cancel the Internet" and "What if I don't need the Internet but want to use the phone?", and outputs these as the question reception log data.

In order to increase the precision of determinations, the question determining unit 12 performs learning by using utterance data of voices. As the utterance data, manually transcribed data with labels each indicating whether a data item is a question, may be used for learning; alternatively, voice-recognized texts and/or confusion networks with labels may be used for learning. During the estimation, instead of transcribed data, voice-recognized texts and/or confusion networks are input; therefore, it is desirable to perform learning by using the latter.

Note that it is often the case that questions to be added as FAQ come from customers. Therefore, document data obtained by applying voice recognition only to the utterance of the customer may be set as the reception log data. Alternatively, the utterance of the operator; confirmation of the intention or repeated questions from the operator to the customer; and the like, may be used as data to be processed. Extracting only the utterance of the customer from the voice recognition result illustrated in FIG. 2A results in data as illustrated in FIG. 3A. Results obtained by inputting this reception log data into the question determining unit 12 are as illustrated in FIG. 3B.

The click action log data obtaining unit 13 obtains click action log data from the voice mining system 2, and outputs the data to the query log extracting unit 14.

FIG. 4 illustrates examples of FAQ registered in a FAQ search system. Each FAQ item includes a FAQID as an identifier for distinguishing the FAQ item from the other.

FIG. 5 illustrates an example of click action log data. Here, although the click action log is used as an example of feedback in the case where an operator at a contact center or the like is responding, in the case of automatic response made by a chatbot, a speech dialogue agent, or the like, an answer from the customer to a question asking to what extent the response was useful, or data obtained by estimating or converting a degree of usefulness of a series of responses for the customer, may be used as a log. Click action log data illustrated in FIG. 5 includes fields of search query, FAQID, click result, and date and time information. Here, the search query corresponds to a query input into a search window by an operator. The click result is information representing whether an operator clicked a button for indicating that the search result was useful, or a button for indicating that the search result was useless, which may be set with data obtained by converting a multi-level degree of usefulness by threshold processing or the like. The date and time information refers to information representing the date and time when the operator clicked the button for indicating that the search result was useful or the button for indicating that the search result was useless.

From such click action log data input from the click action log data obtaining unit 13, the query log extracting unit 14 collects search queries corresponding to FAQ determined to be useless to customers (determined as useless by the operator), extracts the search queries as query log data, and outputs the query log data to the maintenance question candidate extracting unit 15.

In the example illustrated in FIG. 5, among the obtained click log action data items, for those data items indicated as useless for all FAQ items resulting from a search performed on the search queries, the query log extracting unit 14 extracts search queries from log data. In the example in FIG. 5, three search queries, "deletion history", "Internet getting started", and "Internet contract", for which all of the FAQ items found for the search queries were useless, are set as items of query log data.

Also, among the logs indicated as all results searched for queries were useless, the query log extracting unit 14 may set as the query log data only part of the logs during a specific period of time, by using the date and time information. For example, in the example illustrated in FIG. 5, in the case of extracting only logs after 13:00 on Jun. 22, 2017, "Internet getting started" and "Internet contract" are extracted as the query log data.

The maintenance question candidate extracting unit 15 performs clustering with elements of question items of FAQ registered in the FAQ search system (hereafter, referred to as "the existing FAQ"); determined question items in the reception log data input from the question determining unit 12; and search queries in the query log data input from the query log extracting unit 14, and based on the clustering result, extracts candidates of question items of FAQ to be maintained (candidate data items to be added and candidate data items to be deleted), and outputs the candidates to the outside. Note that any known method can be used for clustering of documents.

Next, a FAQ maintenance support method according to an embodiment of the present invention will be described. FIG. 6 is a flow chart illustrating a processing example of FAQ maintenance support using the FAQ maintenance support device 1.

The reception log data obtaining unit 11 obtains reception log data from the voice mining system 2, and in the case where the reception log data is available as text data, the data stored in the voice mining system 2 or an equivalent system may be used (Step S101). Next, from the reception log data, which is a document obtained by applying voice recognition to contents of questions and responses between an operator and a customer, the question determining unit 12 extracts determined question items that have been determined as question items of the customer (Step S102).

Next, the click action log data obtaining unit 13 obtains click action log data from the voice mining system 2 (Step S103). Next, from the click action log data, which represents contents of click actions performed by the operator with respect to FAQ obtained by the FAQ search system, the query log extracting unit 14 extracts search queries corresponding to FAQ determined to be useless to the customer (Step S104).

Step S102 of extracting the question reception log data from the reception log data, and Step S103 of extracting the query log data from the click action log data, are steps that are basically executed independently. However, both of the question reception log data and the query log data are data obtained from the same voice mining system 2; therefore, by using the date and time information of the reception log data and of the click action log data, an item of the question reception log data can be associated with an item of the query log data. The question determining unit 12 uses a classifier for determination; therefore, the precision cannot reach 100%, and the question reception log data may include questions that do not need to be searched by the FAQ search system. Therefore, it is also possible to perform cleaning of the question reception log data using the associated data items.

The cleaning of question reception log data will be described. FIG. 7 illustrates an example of click action log data corresponding to reception log data obtained in FIG. 2B. In this case, determined question items obtained from the reception log data are "I want to cancel the Internet" and "What if I don't need the Internet but want to use the phone?" A search query obtained from the click action log is "telephone-only contract". Comparing the date and time information of the reception log data with the date and time information of the click action log, if the difference of date and time between two items of the date and time information is smaller than or equal to a threshold, it is understood that "I want to cancel the Internet" can be associated with "telephone-only contract". In other words, although "I want to cancel the Internet" has been determined as a question item by the question determining unit 12, it can be understood that the operator has not performed a search. It is possible to consider that a question for which the operator saw no need for a search does not need to be added, because even if it is prepared in the FAQ, no search would be performed. For that reason, the question determining unit 12 may obtain the date and time information included in the click action log data; associate each determined question item with a search query; and perform filtering so as to delete questions that have not been associated with search queries among the determined question items (i.e., questions for which the operator has not searched).

Finally, the maintenance question candidate extracting unit 15 performs clustering with elements of question items of the existing FAQ, determined question items, and search queries, and based on the clustering result, extracts candidates of question items of FAQ to be maintained, presents the candidates (Step S105), and ends the process.

Figure 8:
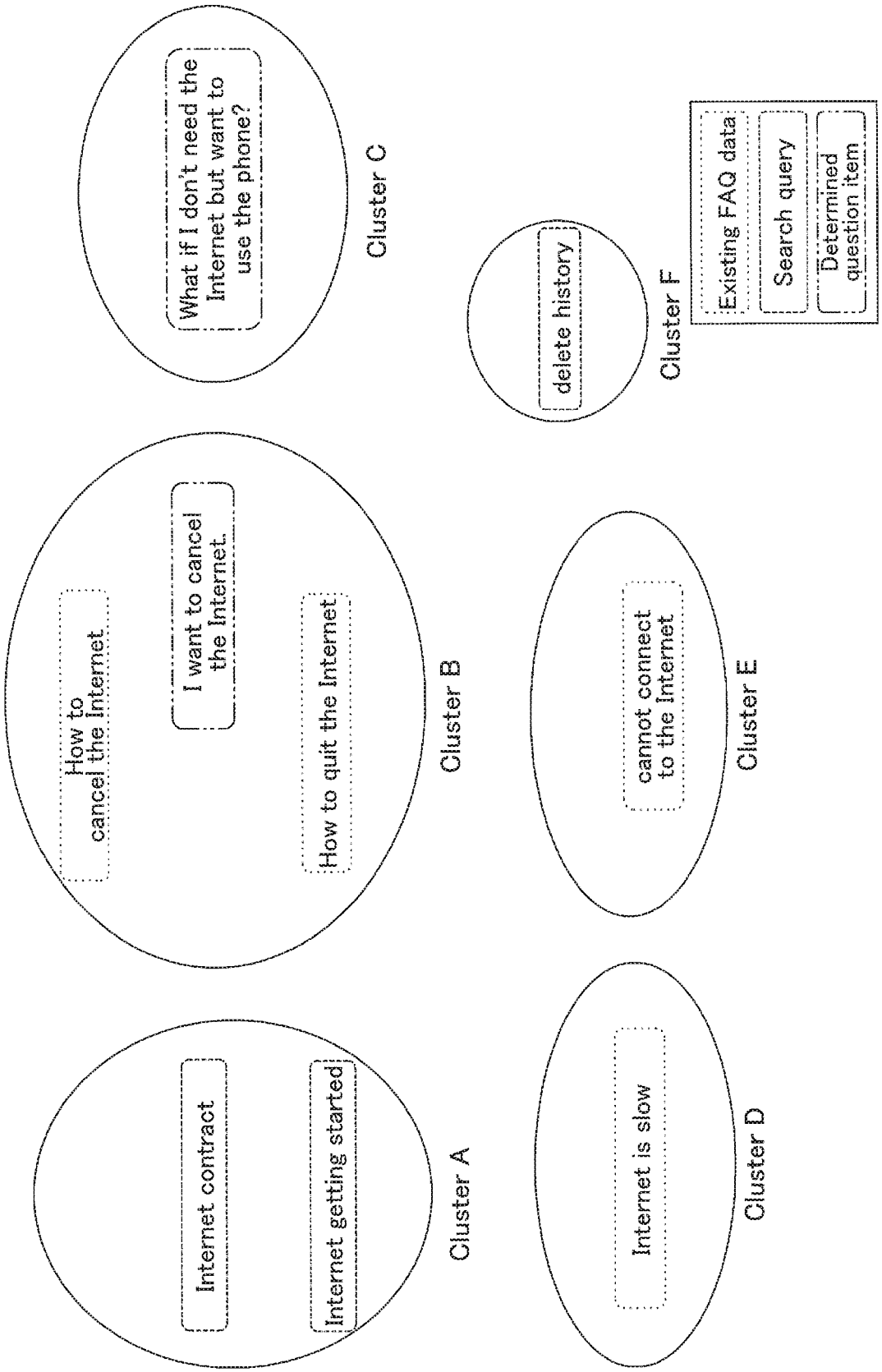
FIG. 8 is a diagram illustrating an example of clustering generated by a FAQ maintenance support device according to an embodiment of the present invention.

FIG. 8 illustrates an example of clustering performed by the maintenance question candidate extracting unit 15. FIG. 8 illustrates a clustering result of inputs constituted with "How to cancel the Internet", "How to quit the Internet", "Internet is slow", and "cannot connect to the Internet" as the question items of the existing FAQ; "I want to cancel the Internet" and "What if I don't need the Internet but want to use the phone?" as the determined question items; and "Internet contract", "Internet getting started", and "deletion history" as the search queries, which are classified into seven clusters from Cluster A to Cluster F.

In the case where there is a cluster that does not include a question item of the existing FAQ, the maintenance question candidate extracting unit 15 presents the cluster to the user as candidate data to be added. This allows the user to set FAQ related to the determined question items or the search queries included in the cluster as candidates to be added to the FAQ of the FAQ search system. Also, in the case where there is a cluster that includes multiple question items in the existing FAQ, the maintenance question candidate extracting unit 15 presents the cluster to the user as candidate data to be deleted. This allows the user to set FAQ related to question items included in duplicate in the cluster as candidates to be deleted from the FAQ of the FAQ search system.

For example, in the case where clustering is performed as illustrated in FIG. 8, Clusters A, C, and F do not include question items of the existing FAQ. Therefore, "Internet contract" and "Internet getting started" as search queries included in Cluster A; "What if I don't need the Internet but want to use the phone?" as a determined question item included in Cluster C; and FAQ related to "deletion history" included in Cluster F are set as candidates to be added to the FAQ of the FAQ search system. Also, Cluster B has multiple question items of the existing FAQ. Therefore, FAQ related to "How to cancel the Internet" and "How to quit the Internet" as the question items included in Cluster B are set as candidates to be deleted from the FAQ of the FAQ search system.

In general, a cluster includes a large number of elements, and it is expected that the number of candidates to be added as FAQ will be enormous, and it is difficult to confirm all of them manually. For that reason, the maintenance question candidate extracting unit 15 may take into account the way to present items in a cluster, and the order of presenting clusters, as follows. First, as for the way to present items in a cluster, the elements of each cluster are sorted such that one closer to the center of gravity of the cluster comes earlier, and the elements are concatenated with delimiters such as tab delimiters to be presented. This enables to prioritize representative question candidate sentences in the cluster when presenting to the user.

For example, in Cluster A illustrated in FIG. 8, there are multiple elements (question candidate sentences) of "Internet contract" and "Internet getting started". By calculating the center of gravity of Cluster A and sorting the items in the ascending order of the distance from the center of gravity, the order of "Internet contract" followed by "Internet getting started" is obtained, and the maintenance question candidate extracting unit 15 presents these two elements by concatenating these with a tab delimiter.

Next, as for the order of presenting clusters, the clusters are presented in the order of clusters having higher densities; clusters having greater numbers of elements; or clusters having greater values each obtained by multiplying the density by the ratio of the number of elements in the cluster to the total number of elements. Also, for candidates to be deleted, the order of presentation is determined by a similar method. Here, the number of elements is the number of elements in a cluster; the density is the number of elements divided by the area of a cluster; and the ratio of the number of elements is the number of elements in a cluster divided by the number of all elements. Although the method of calculating the area of a cluster varies depending on the clustering method, the area may be assumed to be, for example, an area of a circle whose radius is a distance between the center of gravity and an element positioned farthest from the center in the cluster.

FIG. 9 illustrates an example of the number of data items, area, density, ratio of the number of elements, and ratio of the density and the number of elements for Clusters A, C, and F that are candidates to be added in FIG. 8.

Figure 10:
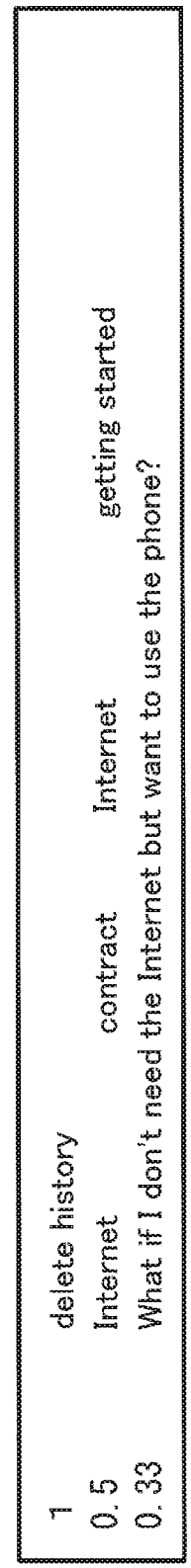
FIG. 10 is a diagram illustrating an example of data of candidates to be added presented by a FAQ maintenance support device according to an embodiment of the present invention.

Also, FIG. 10 illustrates an example of data of candidates to be added presented by the maintenance question candidate extracting unit 15. In the example illustrated in FIG. 10, the order is considered for clusters to be presented as candidates to be added as illustrated in FIG. 9, and Clusters F, A, and C are presented in descending order of the density. Note that as for Cluster A, as described above, the two elements are concatenated with a tab delimiter to be presented.

Also, in the case where the number of elements in a cluster exceeds a threshold, the maintenance question candidate extracting unit 15 may perform clustering recursively. This enables to obtain finer clusters and to optimize the size of the clusters.

As described above, the present invention performs clustering with elements of question items of the existing FAQ, determined question items, and search queries, and based on the clustering result, extracts candidates of question items of FAQ to be maintained. According to the present invention, by performing clustering by mixing determined question items and search queries described above with the existing FAQ, it is possible to automatically measure a threshold for determining the similarity to any of the existing FAQ by a clustering algorithm, and to present a cluster in which question items of the existing FAQ are not present in the cluster as data of candidates to be added. Therefore, it is possible to eliminate time and effort to listen to a large amount of voice data to consider FAQ to be additionally registered in a FAQ search system, which has been done conventionally.

Also, although there may be cases where the existing FAQ includes FAQ that have been registered in duplicate by mistake, in the present invention, by performing the clustering described above, in the case where there are multiple question items of the existing FAQ having the same content in a cluster, it is possible to present the items as data of candidates to be deleted.

Also, in the present invention, candidates of question items for FAQ to be maintained are extracted based on a result of clustering; therefore, when presenting the extraction result, it is possible to perform sort by a priority such as sorting and presenting the elements of each cluster in ascending order of the distance to the center of gravity of the cluster; or presenting clusters in an order of clusters having higher densities, clusters having greater numbers of elements, or clusters having greater values each obtained by multiplying the density by the ratio of the number of elements in the cluster to the total number of elements. This enables to more efficiently consider addition and deletion of FAQ.

Figure 11:
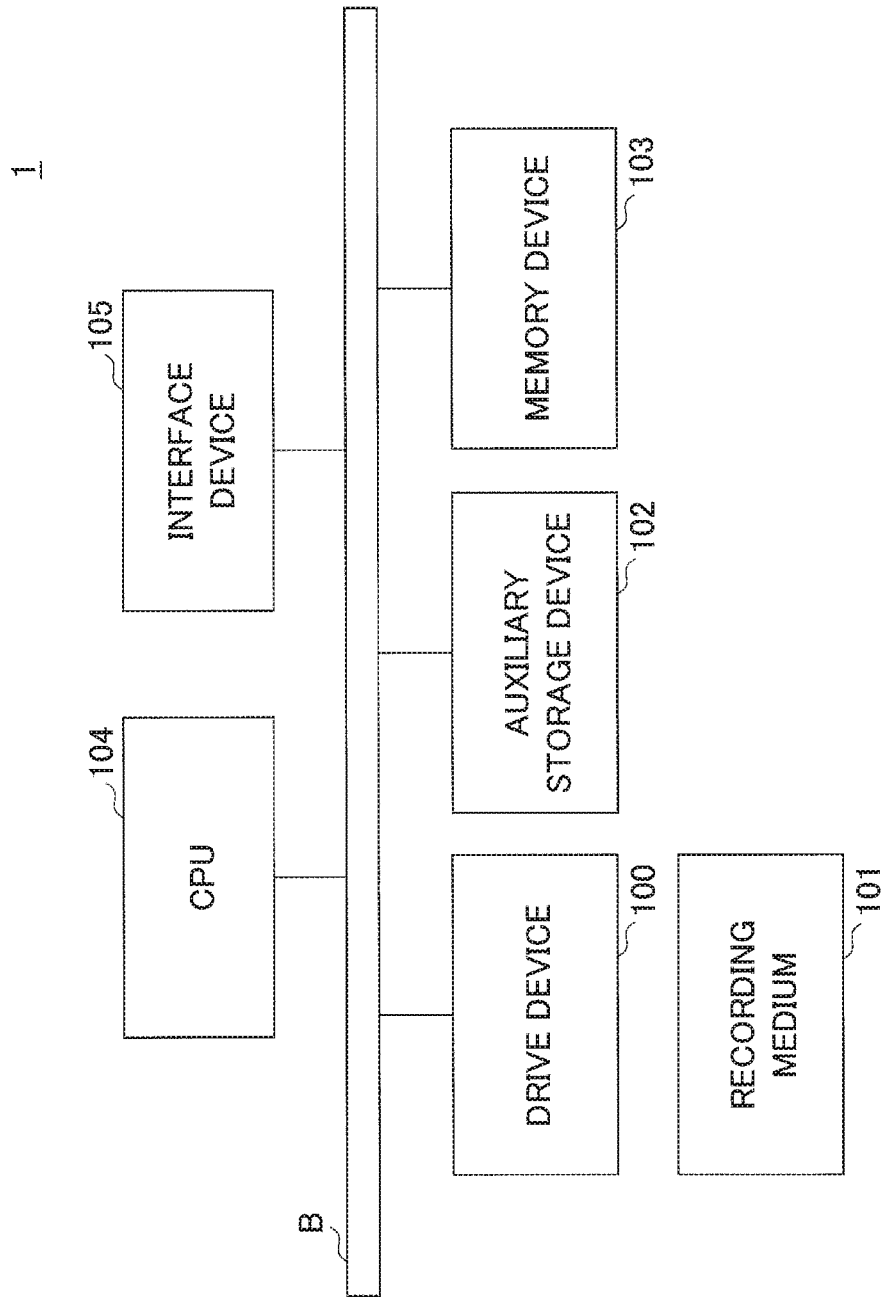
FIG. 11 is a diagram illustrating an example of a hardware configuration of a FAQ maintenance support device according to an embodiment of the present invention.

Note that FIG. 11 is a diagram illustrating an example of a hardware configuration of FAQ maintenance support device according to an embodiment of the present invention. The FAQ maintenance support device 1 in FIG. 11 includes a drive device 100, an auxiliary storage device 102, a memory device 103, a CPU 104, and an interface device 105, which are connected with each other via a bus B.

A program that implements processing on the FAQ maintenance support device 1 is provided by a recording medium 101. When the recording medium 101 recording the program is set into the drive device 100, the program is installed in the auxiliary storage device 102 from the recording medium 101 through the drive device 100. However, installation of the program does not necessarily need to be done from the recording medium 101; the program may be downloaded from another computer via a network. The auxiliary storage device 102 stores the installed program and stores necessary files, data, and the like.

The memory device 103 reads out the program from the auxiliary storage device 102 and stores the program when an activation command of the program is received. The CPU 104 executes functions relating to the FAQ maintenance support device 1 according to the program stored in the memory device 103. The interface device 105 is used as an interface for connecting to a network.

Note that as examples of the recording medium 101, portable recording media such as a CD-ROM, a DVD, and a USB memory may be listed. Also, as examples of the auxiliary storage device 102, an HDD (Hard Disk Drive) and a flash memory may be listed. Both of the recording medium 101 and the auxiliary storage device 102 correspond to computer-readable recording media.

In the case where the hardware of FAQ maintenance support device 1 is configured as illustrated in FIG. 11, the FAQ maintenance support device 1 includes a reception log data obtaining unit 11, a question determining unit 12, a click action log data obtaining unit 13, a query log extracting unit 14, and a maintenance question candidate extracting unit 15, each of which is implemented by a process that one or more programs installed in the FAQ maintenance support device 1 cause the CPU 104 to execute.

Although the above embodiment has been described as a representative example, it is apparent to those skilled in the art that many modifications and substitutions can be made within the gist and scope of the present invention. For example, although the reception log data and the question item of the FAQ are described as data that has been converted and processed into text data in advance, a series of operations may be performed while retaining the data as voice data. Therefore, the present invention should not be construed as limited by the embodiment described above, and various modifications and changes can be made without departing from the scope of the claims. For example, multiple elements described in the configuration diagram of the embodiment can be combined into one, or one element can be partitioned.

The present application claims the priority of Japanese Patent Application No. 2018-22425 filed on Feb. 9, 2018, the entirety of which is hereby incorporated by reference.

LIST OF REFERENCE SYMBOLS

1 FAQ maintenance support device
2 voice mining system
11 reception log data obtaining unit
12 question determining unit
13 click action log data obtaining unit
14 query log extracting unit
15 maintenance question candidate extracting unit
100 drive device
101 recording medium
102 auxiliary storage device 103 memory device
104 CPU
105 interface device
B Bus

The invention claimed is:

1. A frequently asked questions (FAQ) maintenance support device for maintaining aspects of FAQ including a pair of a question item and a response, the FAQ maintenance support device comprising:
 a processor; and
 a memory storing computer executable instructions that when executed by the processor cause a system to:
  extract, from reception log data, customer question items that have been determined as question items posed by a customer, from contents of an inquiry from the customer and a response to the customer, wherein the extracting of the customer question items deletes customer question items that are not associated with the search queries among the extracted customer question items;
  extract, from click action log data, search queries previously executed to search FAQ in an FAQ search system, wherein the search queries are based on the extracted customer question items, the search queries as recorded in the click action log data indicates as useless, the useless as indication of the search queries is based on an interactive operation of receiving an answer whether at least a part of question items of FAQ in search results of the search queries has been determined as helpful for identifying responses to the customer question items, and the search queries are distinct from the question items of FAQ;
  perform recursively clustering of items for identifying similarity among the question items of FAQ and search queries for retrieving the question items of FAQ, the items comprising at least one of:
   the question items of FAQ registered in the FAQ search system,
   the customer question items, and
   the extracted search queries; and
  based on the clustered items, providing at least one candidate question item of FAQ for maintenance, to cause either add or delete an FAQ associated with the at least one candidate question item of FAQ in the FAQ search system.

2. The FAQ maintenance support device as claimed in claim 1, wherein the performing of the clustering presents at least one of:
 a first cluster, the first cluster not including the question items of FAQ registered in the FAQ search system are not present, and
 a second cluster, the second cluster including a plurality of question items of FAQ registered in the FAQ search system.

3. The FAQ maintenance support device as claimed in claim 1, wherein the performing of the clustering sorts and presents items of at least one cluster in ascending order of a distance to a center of gravity of the at least one cluster.

4. The FAQ maintenance support device as claimed in claim 1, wherein the performing of the clustering presents a set of clusters ordered based on one of:
 clusters having higher densities,
 clusters having greater numbers of items, or
 clusters having greater values each obtained by multiplying a density by a ratio of a number of items in a cluster to a total number of items.

5. The FAQ maintenance support device as claimed in claim 1, wherein, the performing of the clustering performs clustering recursively based on a predetermined threshold on a number of items in a cluster.

6. The FAQ maintenance support device as claimed in claim 1, wherein the click action log data indicate content of a click result as input corresponding to the at least a part of question items of FAQ in search results in the FAQ search system.

7. The FAQ maintenance support device as claimed in claim 1, wherein the click action log data comprise a search query and a result of a click action as input by an operator.

8. The FAQ maintenance support device as claimed in claim 7, wherein the search query represents a query entered by the operator.

9. The FAQ maintenance support device as claimed in claim 7, wherein the result of a click action comprises information indicating whether the operator entered a click operation on an interactive button to notify that a search result of the search results is useful or not useful.

10. The FAQ maintenance support device as claimed in claim 1, wherein, when a cluster as a result of the performing of the clustering is without a question item of FAQ, the cluster represents additional candidate data, and an FAQ related to a customer question item or the extracted search queries in the cluster represent candidates to be added as new FAQ of the FAQ search system.

11. The FAQ maintenance support device as claimed in claim 1, wherein, when a cluster as a result of the performing of the clustering comprises a plurality of question items of FAQ, the plurality of question items of FAQ that are duplicate questions in the cluster represent as a candidate FAQ for deletion in the FAQ search system.

12. The FAQ maintenance support device as claimed in claim 1, the computer executable instructions when executed by the processor further cause a system to:
 obtain the reception log data and the click action log data from a voice mining system; and
 generate a link between a voice recognition result as a customer question item in the reception log data and a search query in the click action log data according to date and time information of respective items in the reception log data in the click action log data.

13. The FAQ maintenance support device as claimed in claim 1, wherein when a question item of the question items is not associated with an extracted search query of the extracted search queries in a cluster, the question item of the question items represents a candidate FAQ for deletion in the FAQ search system.

14. A computer-implemented method for maintaining frequently asked questions (FAQ) including a pair of a question item and a response, the method comprising:
 extracting from reception log data, customer question items that have been determined as question items posed by a customer, from contents of an inquiry from the customer and a response to the customer, wherein the extracting of the customer question items deletes customer question items that are not associated with the search queries among the extracted customer question items;
 extracting, from click action log data, search queries previously executed to search for question items of FAQ in an FAQ search system, wherein the search queries are based on the extracted customer question items, the search queries as recorded in the click action log data indicates as useless, the useless as indication of the search queries is based on an interactive operation of answering whether at least a part of question items of FAQ in search results of the search queries has been determined as helpful for identifying responses to the customer question items, and the search queries are distinct from the question items of FAQ;

performing recursively clustering of items for identifying similarity among the question items of FAQ and search queries for retrieving the question items of FAQ, the items comprising at least one of:

the question items of FAQ registered in the FAQ search system, the customer question items, and the extracted search queries; and based on the clustered items, providing at least one candidate question item of FAQ for maintenance, to cause either add or delete an FAQ associated with the at least one candidate question item of FAQ in the FAQ search system.

15. A computer-readable non-transitory recording medium storing computer-executable instructions that when executed by a processor cause a computer system to:

extract, from reception log data, customer question items, the customer questions representing question items posed by a customer, from contents of an inquiry from the customer and a response to the customer, wherein the extracting of the customer question items deletes customer question items that are not associated with the search queries among the extracted customer question items;

extract, from click action log data, search queries previously executed to search for question items of FAQ in an FAQ search system, wherein the search queries are based on the extracted customer question items, the search queries as recorded in the click action log data indicates as useless, the useless as indication of the search queries is based on an interactive operation of receiving an answer whether at least a part of question items of FAQ in search results of the search queries has been determined as helpful for identifying responses to the customer question items, and the search queries are distinct from the question items of FAQ;

perform recursively clustering of items for identifying similarity among the question items of FAQ and search queries for retrieving the question items of FAQ, the items comprising at least one of:

the question items of FAQ registered in the FAQ search system, the customer question items, and the extracted search queries; and based on the clustered items, provide at least one candidate question item of FAQ for maintenance to cause either add or delete an FAQ associated with the at least one candidate question item of FAQ in the FAQ search system.

\* \* \* \* \*